(12) United States Patent
Itadani

(10) Patent No.: US 10,352,449 B2
(45) Date of Patent: Jul. 16, 2019

(54) MECHANICAL SEAL

(71) Applicant: EAGLE INDUSTRY CO., LTD., Tokyo (JP)

(72) Inventor: Masatoshi Itadani, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/326,410

(22) PCT Filed: Jul. 14, 2015

(86) PCT No.: PCT/JP2015/070102
§ 371 (c)(1),
(2) Date: Jan. 13, 2017

(87) PCT Pub. No.: WO2016/013444
PCT Pub. Date: Jan. 28, 2016

(65) Prior Publication Data
US 2017/0198813 A1 Jul. 13, 2017

(30) Foreign Application Priority Data

Jul. 24, 2014 (JP) ................................. 2014-150448

(51) Int. Cl.
*F04C 2/00* (2006.01)
*F16J 15/32* (2016.01)
(Continued)

(52) U.S. Cl.
CPC ................. *F16J 15/32* (2013.01); *F04C 2/00* (2013.01); *F04D 13/06* (2013.01); *F04D 29/043* (2013.01);
(Continued)

(58) Field of Classification Search
CPC .......... F16J 15/002; F16J 15/32; F04D 13/06; F04D 29/043; F04D 29/124; F04D 29/406
See application file for complete search history.

(56) References Cited

U.S. PATENT DOCUMENTS 2,100,220 A * 11/1937 King ........................ F16J 15/36
277/391
2,610,874 A * 9/1952 Payne ...................... F16J 15/36
277/373

(Continued)

FOREIGN PATENT DOCUMENTS

CN          1513095       7/2004     ............. F02M 59/44
CN        202370791       8/2012     ............. F04B 39/00
(Continued)

OTHER PUBLICATIONS

International Search Report (with translation) and Written Opinion issued in corresponding application No. PCT/JP2015/070102, dated Sep. 8, 2015 (9 pgs).

(Continued)

*Primary Examiner* — Eugene G Byrd
(74) *Attorney, Agent, or Firm* — Hayes Soloway P.C.

(57) ABSTRACT

A mechanical seal has a stationary side seal ring and a rotating side seal ring in opposed sliding contact with the stationary side seal ring. One seal ring of the stationary side seal ring and the rotating side seal ring is disposed on a sealed fluid side and constitutes a slide bearing which supports the rotating shaft. The other seal ring is disposed on the opposite side to the sealed fluid side, and a pressing member is attached to the other seal ring for biasing the other seal ring in the axial direction to press sealing faces of both the seal rings.

3 Claims, 3 Drawing Sheets

(51) Int. Cl.

| | | |
|---|---|---|
| *F16J 15/34* | (2006.01) | |
| *F16J 15/36* | (2006.01) | |
| *F04D 13/06* | (2006.01) | |
| *F04D 29/043* | (2006.01) | |
| *F04D 29/12* | (2006.01) | |
| *F04D 29/18* | (2006.01) | |
| *F04D 29/40* | (2006.01) | |
| *F16J 15/00* | (2006.01) | |

(52) U.S. Cl.
CPC ........... *F04D 29/124* (2013.01); *F04D 29/18* (2013.01); *F04D 29/406* (2013.01); *F16J 15/002* (2013.01); *F16J 15/34* (2013.01); *F16J 15/3464* (2013.01); *F16J 15/36* (2013.01)

(56) References Cited

U.S. PATENT DOCUMENTS

| | | | | |
|---|---|---|---|---|
| 2,729,478 | A * | 1/1956 | Chambers, Jr. | F16J 15/32 277/390 |
| 2,979,347 | A * | 4/1961 | Arutunoff | F16J 15/54 277/348 |
| 3,614,272 | A * | 10/1971 | Lightfoot | F04D 7/02 415/168.2 |
| 4,426,089 | A * | 1/1984 | Takenaka | F16J 15/002 277/348 |
| 4,427,204 | A * | 1/1984 | Alley | F16J 15/32 277/372 |
| 4,815,747 | A * | 3/1989 | Wolford | F04D 29/126 277/306 |
| 5,725,219 | A * | 3/1998 | Gilbert | F16J 15/36 277/377 |
| 5,893,564 | A * | 4/1999 | Yang | F16J 15/348 277/374 |
| 6,311,983 | B1 * | 11/2001 | Burcham | F16J 15/002 277/370 |
| 6,464,231 | B2 * | 10/2002 | Burroughs | F16J 15/363 277/385 |
| 6,655,694 | B1 * | 12/2003 | Nakano | F16J 15/36 277/370 |
| 8,348,639 | B2 | 1/2013 | Okada et al. | 417/423.11 |
| 8,714,556 | B2 * | 5/2014 | Pinto | B22F 5/106 277/371 |
| 9,010,764 | B2 * | 4/2015 | Hoffmann | F16J 15/3476 277/358 |
| 9,581,248 | B2 * | 2/2017 | Itadani | F16J 15/34 |
| 2003/0006560 | A1 * | 1/2003 | Dahlheimer | F16J 15/3468 277/389 |
| 2006/0038353 | A1 * | 2/2006 | Murakami | F04D 29/126 277/399 |
| 2009/0096175 | A1 * | 4/2009 | Schwerdtfeger | F16J 15/002 277/549 |
| 2014/0072459 | A1 * | 3/2014 | Kalaysky | F04D 29/0413 417/365 |
| 2014/0319774 | A1 * | 10/2014 | Borasso | F16J 15/3452 277/385 |

FOREIGN PATENT DOCUMENTS

| | | | |
|---|---|---|---|
| CN | 202867170 | 4/2013 | ............. F04B 53/00 |
| JP | 178279 | 12/1989 | ............. F16J 15/34 |
| JP | 2005188393 | 7/2005 | ............. F04B 53/00 |
| JP | 2013200005 | 10/2013 | ............. F16J 15/34 |
| JP | 2014047809 | 3/2014 | ............. F16J 15/34 |

OTHER PUBLICATIONS

International Preliminary Report on Patentability (with translation) issued in corresponding application No. PCT/JP2015/070102, dated Jan. 24, 2017 (12 pgs).

Chinese Office Action (w/translation) issued in application No. 201580038231.4, dated Dec. 28, 2017 (12 pgs).

Chinese Office Action (w/translation) issued in application No. 201580038231.4, dated Sep. 17, 2018 (11 pgs).

\* cited by examiner

MECHANICAL SEAL

TECHNICAL FIELD

The present invention relates to a mechanical seal, and particularly relates to a mechanical seal suitable for an electric water pump or the like, which has the number of parts reduced and is small and inexpensive.

BACKGROUND ART

Conventionally, as an electric water pump which has the number of parts reduced, and is small and inexpensive, for example, there is known the electric water pump configured as follows. In the electric water pump, as shown in FIG. 3, a pump part 52 is formed at one end side of a main shaft 51 arranged within a housing 50, and a motor part 53 is formed at the other end side. The electric water pump is provided with a housing base 56 which partitions a motor housing 54 accommodating the motor part 53 therein and a pump housing 55 accommodating the pump part 52 therein. In the housing base 56, a through hole 56a for inserting the main shaft 51 therein is formed, and on the motor part 53 side of the main shaft 51, a large diameter part 51a supporting a magnet 58 is formed. A rotor part 57 of the motor is formed by these large diameter part 51a and magnet 58. The main shaft 51 is rotatably supported by a ball bearing 60 arranged on a bottom part 59 of the motor housing 54, and a bearing sleeve 61. The sleeve 61 constitutes a slide bearing which supports rotation of the main shaft 51 and is constituted as a stationary side seal ring of a mechanical seal for shaft-sealing the through hole 56a of the housing base 56, and is fitted to the inner periphery of the through hole 56a of the housing base 56 via an O-ring 62, and a convex part 61a provided on the end thereof is pressed to the large diameter part 51a constituting the rotor part 57 (Hereinafter, referred to as "Conventional Art". For example, see Patent Citation 1.).

CITATION LIST

Patent Literature

Patent Citation 1: Japanese Laid-open Patent Publication No. 2005-188393 (Page 4, FIG. 1)

SUMMARY OF INVENTION

Technical Problem

In Conventional Art described above, the large diameter part 51a of the main shaft 51 is also used as a rotating side seal ring, so there is a problem in that if the large diameter part 51a is worn due to sliding, the main shaft 51 has to be replaced and the replacement is not easy. Moreover, the properties as a sliding member is required for the large diameter part 51a, but there is also a problem in that if the entire main shaft 51 is formed of a material suitable for the sliding material, cost is increased, or the like.

Further, in the above-described Conventional Art, the sleeve 61 being used as both the slide bearing and the stationary side seal ring is configured so as to be movable in the axial direction (it is a structure in which a pressing member that elastically springs the seal ring is installed on the stationary side, the so-called "stationary type"), and therefore the gap in the radial direction of a bearing surface of the sleeve 61 has to be set large. Therefore, there is also a problem in that the main shaft 51 rattles on the bearing surface, which might damage the bearing surface.

An object of the present invention is to provide a mechanical seal, either of two seal rings thereof providing a function of a slide bearing, in which rattling in the radial direction on a bearing part is reduced as much as possible by eliminating the need for axial movement of the seal ring used also as the slide bearing, and replacement of the seal rings are facilitated.

Solution to Problem

In order to achieve the above object, in a first aspect, a mechanical seal of the present invention which is housed in a seal cavity formed between a housing and a rotating shaft and which seals between the housing and the rotating shaft, is characterized in that the mechanical seal comprises a stationary side seal ring and a rotating side seal ring in opposed sliding contact with the stationary side seal ring, one seal ring of the stationary side seal ring and the rotating side seal ring is disposed on a sealed fluid side and constitutes a slide bearing which supports the rotating shaft, the other seal ring is disposed on an opposite side to the sealed fluid side, and a pressing member is attached to the other seal ring for biasing the other seal ring in an axial direction to press sealing faces of both the seal rings.

According to the first aspect, it goes without saying that one seal ring can be also used as the bearing, and the need for axial movement of the one seal ring constituting the slide bearing is eliminated, and therefore, the gap of the slide bearing can be reduced, and a good slide bearing with less shaft run-out of the rotating shaft can be obtained.

Moreover, the one seal ring constituting the slide bearing which supports the rotating shaft is installed on a high-pressure fluid side (the sealed fluid side), and therefore it is unnecessary to newly supply a lubricant to the slide bearing portion.

Further, the other seal ring is configured from another dedicated member without using also a portion of the rotating shaft, thereby replacement can be facilitated if the other seal ring needs to be replaced due to damage or wear. Moreover, because design flexibility of the other seal ring is increased, the other seal ring can be made small, and in accordance with this, the pressing member for axial pressing also can be miniaturized, and therefore the entire mechanical seal can be made compact.

Moreover, in a second aspect, a mechanical seal of the present invention is an outside mechanical seal which is housed in a seal cavity formed between a housing and a rotating shaft and which seals a fluid tending to leak to an outer diameter side of a sealing face between the housing and the rotating shaft, and is characterized in that the mechanical seal comprises a stationary side seal ring and a rotating side seal ring in opposed sliding contact with the stationary side seal ring, the stationary side seal ring is disposed on a sealed fluid side and constitutes a slide bearing which supports the rotating shaft, the rotating side seal ring is disposed on an opposite side to the sealed fluid side, and a pressing member is attached to the rotating side seal ring for biasing the rotating side seal ring in an axial direction to press the sealing faces of both the seal rings.

According to the second aspect, it goes without saying that the rotating side seal ring can be also used as the bearing, and the need for axial movement of the rotating side seal ring constituting the slide bearing is eliminated, and therefore, the gap of the slide bearing can be reduced, and a good slide bearing with less shaft run-out of the rotating shaft can be obtained.

Moreover, the rotating side seal ring constituting the slide bearing which supports the rotating shaft is installed on a high-pressure fluid side (the sealed fluid side), and therefore it is unnecessary to newly supply a lubricant to the slide bearing portion.

Further, the rotating side seal ring is configured from another dedicated member without using also a portion of the rotating shaft, thereby replacement can be facilitated if the rotating side seal ring needs to be replaced due to damage or wear. Moreover, because design flexibility of the rotating side seal ring is increased, the rotating side seal ring can be made small, and in accordance with this, the pressing member for axial pressing also can be miniaturized, and therefore the entire mechanical seal can be made compact.

Moreover, in a third aspect, the mechanical seal according to the second aspect of the present invention is characterized in that the housing is a housing of an electric water pump, the housing is provided with a pump part, a motor part, and a partition member dividing the pump part and the motor part, the stationary side seal ring constituting the slide bearing is arranged in a space formed between an inner periphery of the partition member and an outer periphery of the rotating shaft, and the slide bearing is formed on an inner periphery of the stationary side seal ring and an O-ring is interposed between an outer periphery of the stationary side seal ring and the inner periphery of the partition member.

According to the third aspect, a space in the electric water pump can be effectively used, and the axial dimension of the electric water pump can be shortened.

Moreover, in a fourth aspect, a mechanical seal of the present invention is an inside mechanical seal which is housed in a seal cavity formed between a housing and a rotating shaft and which seals a fluid tending to leak to an inner diameter side of a sealing face between the housing and the rotating shaft, and is characterized in that the mechanical seal comprises a stationary side seal ring and a rotating side seal ring in opposed sliding contact with the stationary side seal ring, the rotating side seal ring is disposed on a sealed fluid side, integrally holds the rotating shaft and constitutes a slide bearing, the stationary side seal ring is disposed on the opposite side to the sealed fluid side, a pressing member is attached to the stationary side seal ring for biasing the stationary side seal ring in an axial direction to press the sealing faces of both the seal rings.

According to the fourth aspect, it goes without saying that the rotating side seal ring can be also used as the bearing, and the need for axial movement of the rotating side seal ring constituting the slide bearing is eliminated, and therefore, the gap of the slide bearing can be reduced, and a good slide bearing with less shaft run-out of the rotating shaft can be obtained.

Moreover, the rotating side seal ring constituting the slide bearing which supports the rotating shaft is installed on a high-pressure fluid side (the sealed fluid side), and therefore it is unnecessary to newly supply a lubricant to the slide bearing portion.

Further, the stationary side seal ring is configured from another dedicated member without using also a portion of the rotating shaft, thereby replacement can be facilitated if the stationary side seal ring needs to be replaced due to damage or wear. Moreover, because design flexibility of the stationary side seal ring is increased, the stationary side seal ring can be made small, and in accordance with this, the pressing member for axial pressing also can be miniaturized, and therefore the entire mechanical seal can be made compact.

Moreover, in a fifth aspect, the mechanical seal according to the fourth aspect of the present invention is characterized in that the housing is a housing of an electric water pump, the housing is provided with a pump part, a motor part, and a partition member dividing the pump part and the motor part, the rotating side seal ring constituting the slide bearing is arranged in a space formed between an inner periphery of the partition member and an outer periphery of the rotating shaft, and the slide bearing is formed on an outer periphery of the rotating side seal ring and an O-ring is interposed between an inner periphery of the rotating side seal ring and the outer periphery of the rotating shaft.

According to the fifth aspect, a space in the electric water pump can be effectively used, and the axial dimension of the electric water pump can be shortened.

Advantageous Effects of Invention

The present invention exhibits the following superior effects.

(1) It goes without saying that one seal ring can be also used as the bearing, and the need for axial movement of the one seal ring constituting the slide bearing is eliminated, and therefore, the gap of the slide bearing can be reduced, and a good slide bearing with less shaft run-out of the rotating shaft can be obtained.

(2) Moreover, the one seal ring constituting the slide bearing which supports the rotating shaft is installed on the high-pressure fluid side (the sealed fluid side), and therefore it is unnecessary to newly supply a lubricant to the slide bearing portion.

(3) By constituting the other seal ring from another dedicated member without using also a portion of the rotating shaft, replacement can be facilitated if the other seal ring needs to be replaced due to damage or wear. Moreover, because design flexibility of the other seal ring is increased, the other seal ring can be made small, and in accordance with this, the pressing member for axial pressing also can be miniaturized, and therefore the entire mechanical seal can be made compact.

(4) The space in the electric water pump can be effectively used, and the axial dimension of the electric water pump can be shortened.

DESCRIPTION OF EMBODIMENTS

Hereinafter, with reference to the drawings, modes for carrying out the present invention will be illustratively described based on embodiments. However, unless otherwise expressly stated, the dimensions, materials, shapes, relative arrangements and the like of the components described in the embodiments are not intended to limit the scope of the present invention to only them.

{First Embodiment}

Figure 1:
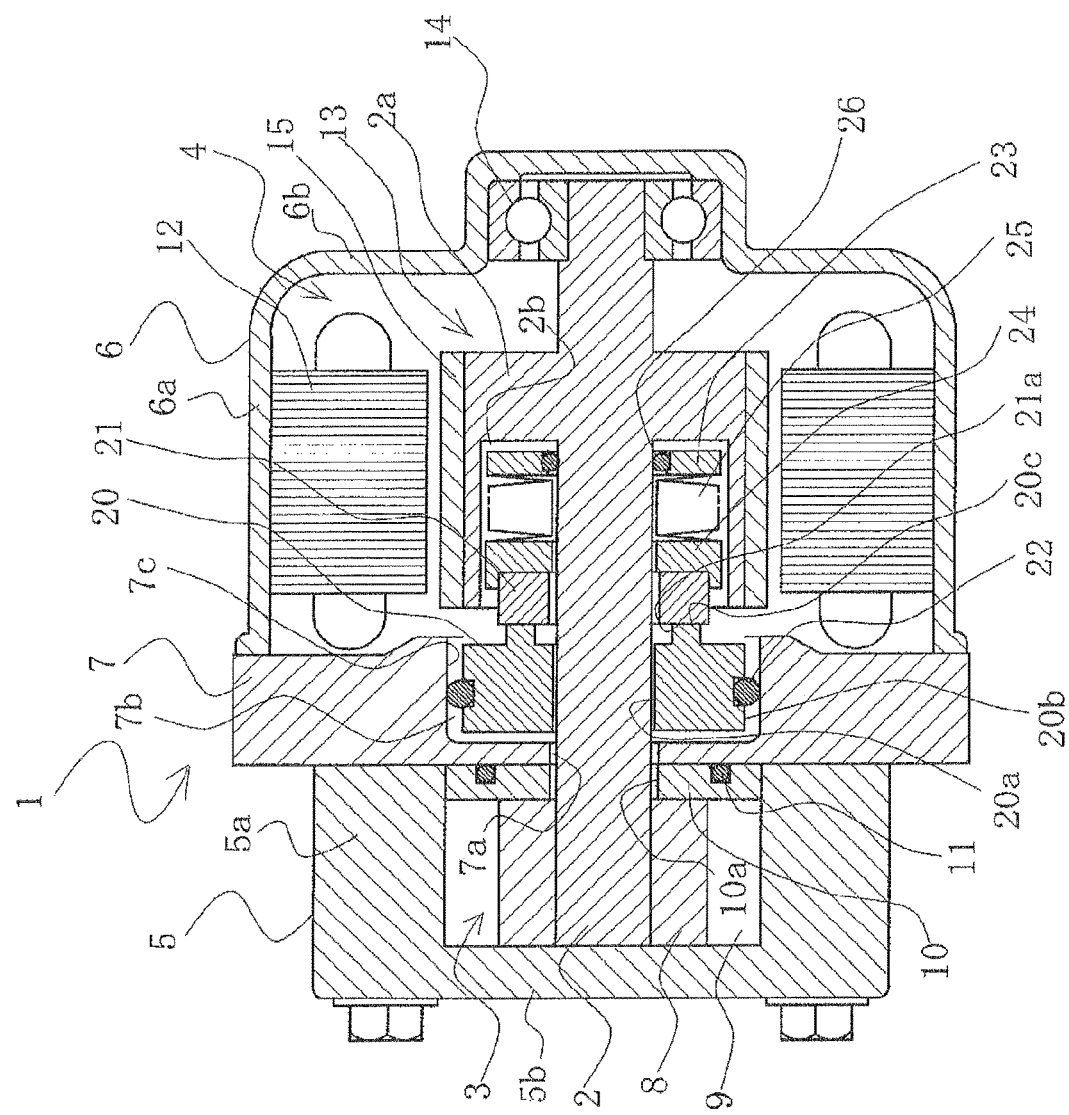
FIG. 1 is a longitudinal cross-sectional view showing a mechanical seal according to a first embodiment of the present invention.

With reference to FIG. 1, a mechanical seal according to a first embodiment of the present invention will be described.

The first embodiment shown in FIG. 1 shows the case where the mechanical seal of the present invention is applied to a small electric water pump in which a pump chamber for pumping a liquid and an electric motor chamber under the air environment are disposed adjacently, and the mechanical seal is an outside type for sealing a fluid on a high-pressure fluid side which tends to leak from the inner periphery of a sealing face (hereinafter, may be referred to as a "rubbing face") toward the outer circumferential direction.

In FIG. 1, a pump part 3 is formed on one end side (the right side in FIG. 1) of a rotating shaft 2 arranged within a housing 1, and a motor part 4 is formed on the other end side (the right side in FIG. 1) thereof.

Moreover, the housing 1 is provided with a pump housing 5 mainly accommodating the pump part 3 therein, a motor housing 6 mainly accommodating the motor part 4 therein, and a partition member 7 dividing these housings.

In the pump part 3, the pump housing 5 consists of a cylindrical part 5a and a bottom part 5b, has a generally U-shaped cross section, and is brought into contact with one side surface of the partition member 7 at the opening side thereof. In an internal storing space, a rotating blade 8 is stored and a pump chamber 9 is formed. Moreover, the rotating blade 8 is rotationally driven by a driving force of the motor part 4 via the rotating shaft 2, and pumps a liquid to a predetermined spot. Further, a side plate 10 is attached to the partition member 7 side of the pump part 3, and an O-ring 11 is attached between the partition member 7 and the sideplate 10, for sealing the liquid so as not to leak to the outside from the pump chamber 9. In the side plate 10, a through hole 10a is formed for inserting the rotating shaft 2 therein, and therefore the liquid leaks to the motor part 4 side from the pump chamber 9.

In the motor part 4, the motor housing 6 consists of a cylindrical part 6a and a bottom part 6b, is formed into a bottomed cup shape opened at one side, and is brought into contact with the side surface opposite to the pump part 3 of the partition member 7 at the opening side thereof. In an internal storing space, a stator part 12 and a rotor part 13 are stored and constitute the motor. Moreover, in the center in the radial direction of the bottom part 6b of the motor housing 6, a ball bearing 14 is arranged for supporting one end of the rotating shaft 2.

The rotating shaft 2 is rotatably supported by the ball bearing 14 arranged in the bottom part 6b of the motor housing 6 and a seal ring (described later) arranged so as to function as a bearing.

On the motor-part 2 side (the right side in FIG. 1) of the rotating shaft 2, a large diameter part 2a which supports a magnet 15 is formed, and the rotor part 13 is constituted by the large diameter part 2a and the magnet 15. The magnet 15 has a width in the axial direction almost same as that of the stator part 12, the outer diameter side of the large diameter part 2a to which the magnet 15 is attached has also a width in the axial direction almost same as that of the stator part 12. In the pump part 3 side on the inner diameter side thereof, a storing space 2b is formed for having the seal ring (described later) stored therein.

It should be noted that the large diameter part 2a is not limited to the form integral with the rotating shaft 2 as shown in FIG. 1, may be the form which, in the outer diameter side, supports the magnet 15 and transmits the driving force to the rotating shaft 2, and which, in the inner diameter side, can store the seal ring and the like, and for example, may be constituted by a member separate from the rotating shaft 2.

The partition member 7 divides the pump housing 5 and the motor housing 6 and holds them, and furthermore, supports one end of the rotating shaft 2 via the seal ring. In addition, the partition member 7 has a predetermined thickness from the need of having a certain strength. Therefore, in the central part of the partition member 7, while a through hole 7 for inserting the rotating shaft 2 therein is formed in the pump part 3 side, a space 7b having a diameter larger than that of the through hole 7a is formed in the motor part 4 side, and the seal ring (described later) is arranged in the space 7b, thus effectively using a space.

Between an inner periphery 7c of the partition member 7 and an outer periphery of the rotating shaft 2, a stationary side seal ring 20 formed so as to constitute a slide bearing is arranged. The stationary side seal ring 20 has not only a mechanical strength but also self-lubricating, wear-resistant properties and the like, and for example, is formed of a material selected from carbon, SiC, hard metal or the like. Then, in an inner periphery 20a of the stationary side seal ring 20, a slide bearing part is formed for rotatably supporting the rotating shaft 2. The gap between the slide bearing part of the inner periphery 20a of the stationary side seal ring 20 and the outer periphery of the rotating shaft is decided in consideration of the operating temperature, the kind of material or the like, but it might be determined according to the gap set in a normal slide bearing.

Moreover, an O-ring 22 is interposed between an outer periphery 20b of the stationary side seal ring 20 and the inner periphery 7c in the space 7b of the partition member 7. That is, the stationary side seal ring 20 is firmly supported on the inner periphery 7c of the partition member 7 via the O-ring 22, and rotatably supports one end of the rotating shaft 2 in the slide bearing part of the inner periphery 20a thereof.

Moreover, in order to stop the rotation and to prevent the axial movement of the stationary side seal ring 20, a projection (or a recess) is provided in the outer periphery 20b of the stationary side seal ring 20, a recess (or a projection) is provided in the inner periphery 7c on the partition member 7 side opposed to the projection (or the recess), and they are fitted to each other, thereby the rotation and the axial movement of the stationary side seal ring 20 may be prevented.

On the opposite side to the pump part 3 side (the sealed fluid side) of the stationary side seal ring 20, a rotating side seal ring 21 in opposed sliding contact with a rubbing face 20c (a sealing face) of the stationary side seal ring 20 is arranged. As with the stationary side seal ring 20, the rotating side seal ring 21 has not only a mechanical strength but also self-lubricating, wear-resistant properties and the like, and for example, the material is selected in consideration of familiarity with the other member from carbon, SiC, hard metal or the like.

By attaching a pressing member 25 for biasing the rotating side seal ring 21 toward the pump part 3 side in the axial direction, a rubbing face 21a of the rotating side seal ring 21 is pressed to the rubbing face 20c of the stationary side seal ring 20.

In this example, the pressing member 25 consists of a bellows, one end of the bellows 25 is coupled to a collar 23 and the other end thereof is coupled to a retainer 24, and the rotating side seal ring 21 is shrink-fitted or press-fitted to the end face of the retainer 24.

It should be noted that, as the pressing member, not only a bellows but also a coil spring may be, of course, used.

The collar 23 is formed of metal and formed into a ring shape, and is fitted to an outer peripheral surface of the rotating shaft 2 via an O-ring 26.

The bellows 25 is formed into a bellows tube shape as a whole, by lining up a plurality of metallic diaphragm plates formed into a wave ring shape by means of punching or the like, and by alternately coupling the portions between the outer diameter parts and between the inner diameter parts of the adjacent diaphragm plates by means of gas welding or the like, and one end thereof is integrally coupled to the collar 23 side by means of gas welding or the like.

The retainer 24 is formed of metal and formed into a tubular shape, and the other end of the bellows 25 is integrally coupled thereto by means of gas welding or the like. The material of the retainer 24 is the same material as the material of the bellows 25 or is the different material whose thermal expansion coefficient is almost approximate thereto.

Usually, the retainer 24, the bellows 25, and the collar 23 are manufactured as a one-piece by welding.

In this example, the rotating side seal ring 21, the bellows 25 which is the pressing member, the collar 23, and the retainer 24 are arranged within the storing space 2b formed in the large diameter part 2a of the rotating shaft 2 in consideration of shortening the axial dimension of the electric water pump.

When the electric water pump configured as above is operated, the rotating blade 8 of the pump part 3 is rotationally driven by a driving force of the motor part 4 via the rotating shaft 2, and pumps a liquid to a predetermined spot. On that occasion, a high-pressure liquid within the pump chamber 9 infiltrates into the space 7b through the through hole 10a of the side plate 10 and the through hole 7a of the partition member 7. The liquid within the space 7b does not leak from the outer periphery 20b side because it is sealed by the O-ring 22 arranged in the outer periphery 20b of the stationary side seal ring 20. On the other hand, the slide bearing part for rotatably supporting the rotating shaft 2 is formed in the inner periphery 20a of the stationary side seal ring 20, and the gap is formed between the slide bearing part and the outer periphery of the rotating shaft, and therefore the liquid leaks to the motor part 4 side through the gap.

However, because the leaked liquid is sealed by a sealing part formed by the rubbing face 20c of the stationary side seal ring 20 and the rubbing face 21a of the rotating side seal ring 21, it does not leak to the outer diameter side than the sealing part. Moreover, because the collar 23 is fixed to the outer peripheral surface of the rotating shaft 2 via the O-ring 26, the liquid is prevented also from leaking outwardly from the inner diameter side of the rotating side seal ring 21, the retainer 24, the bellows 25, and the collar 23.

In this way, the high-pressure liquid within the pump chamber 9 does not leak to the motor part 4 side.

The above-described first embodiment exhibits the following effects.

(1) By constituting the slide bearing which supports the rotating shaft 2 in the stationary side seal ring 20 and attaching the pressing member 25 which biases the rotating side seal ring 21 in the axial direction to the stationary side seal ring 21, it goes without saying that the stationary side seal ring 20 can be also used as the bearing, and the need for axial movement of the stationary side seal ring 20 is eliminated, and therefore, the gap of the slide bearing can be reduced. As a result, in the case where the stationary side seal ring 20 is also used as the bearing, a good slide bearing with less shaft run-out of the rotating shaft can be obtained.

(2) By installing, on the high-pressure fluid side (the sealed fluid side), the stationary side seal ring 20 constituting the slide bearing which supports the rotating shaft 2, it is unnecessary to newly supply a lubricant to the slide bearing portion.

(3) By constituting the rotating side seal ring 21 from another dedicated member without using also a portion of the rotating shaft 2, replacement can be facilitated if the rotating side seal ring 21 needs to be replaced due to damage or wear. Moreover, because design flexibility of the rotating side seal ring 21 is increased, the rotating side seal ring 21 can be made small, and in accordance with this, the pressing member 25 for axial pressing also can be miniaturized, and therefore the entire mechanical seal can be made compact.

(4) By arranging the stationary side seal ring 20 within the space of the partition member 7, the space can be effectively used, and the axial dimension of the electric water pump can be shortened.

(5) By arranging the rotating side seal ring 21, the bellows 25 which is the pressing member, the collar 23, and the retainer 24 within the storing space 2b formed in the large diameter part 2a of the rotating shaft 2, the axial dimension of the electric water pump can be shortened.

{Second Embodiment}

Figure 2:
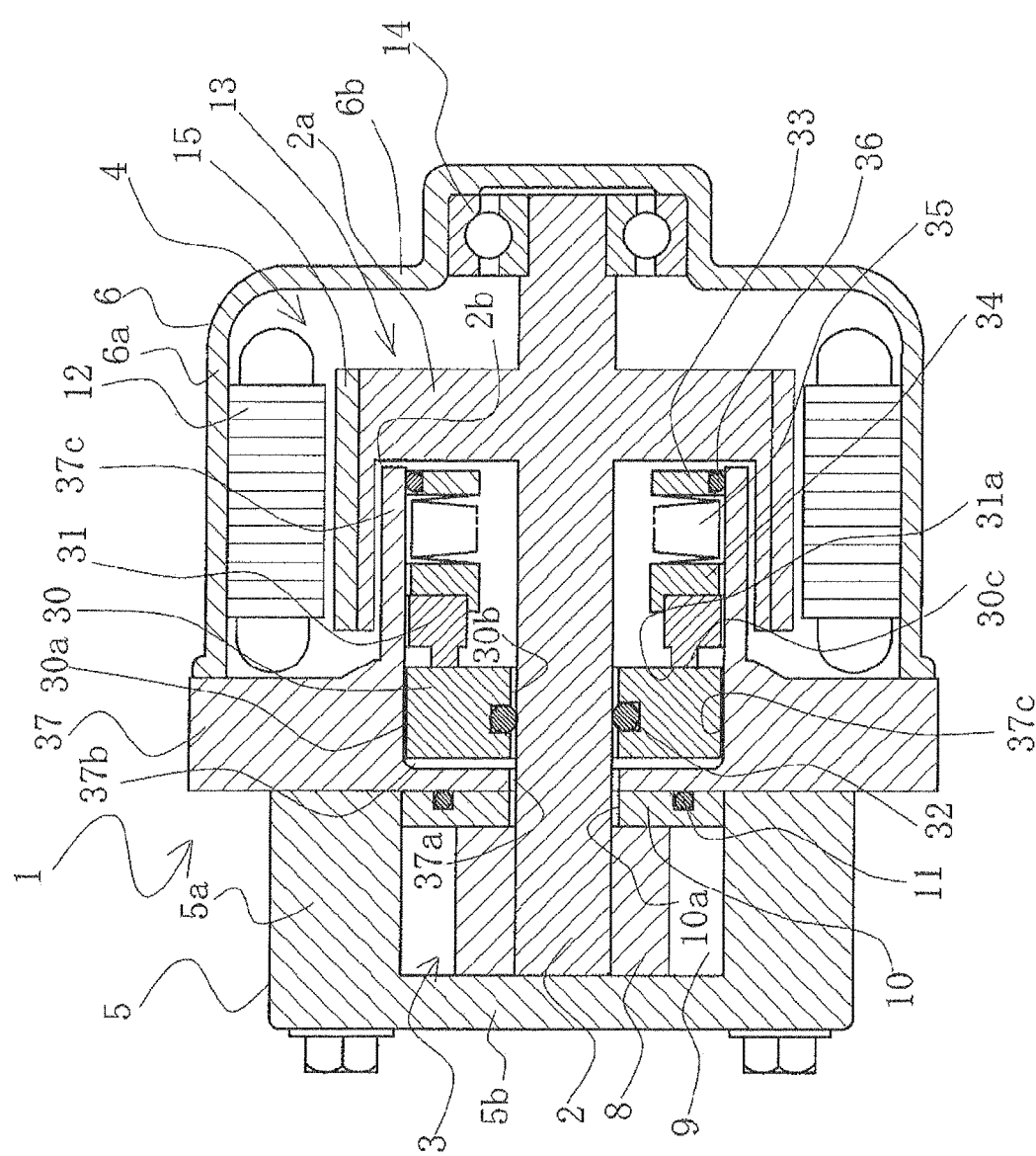
FIG. 2 is a longitudinal cross-sectional view showing a mechanical seal according to a second embodiment of the present invention.
Figure 3:
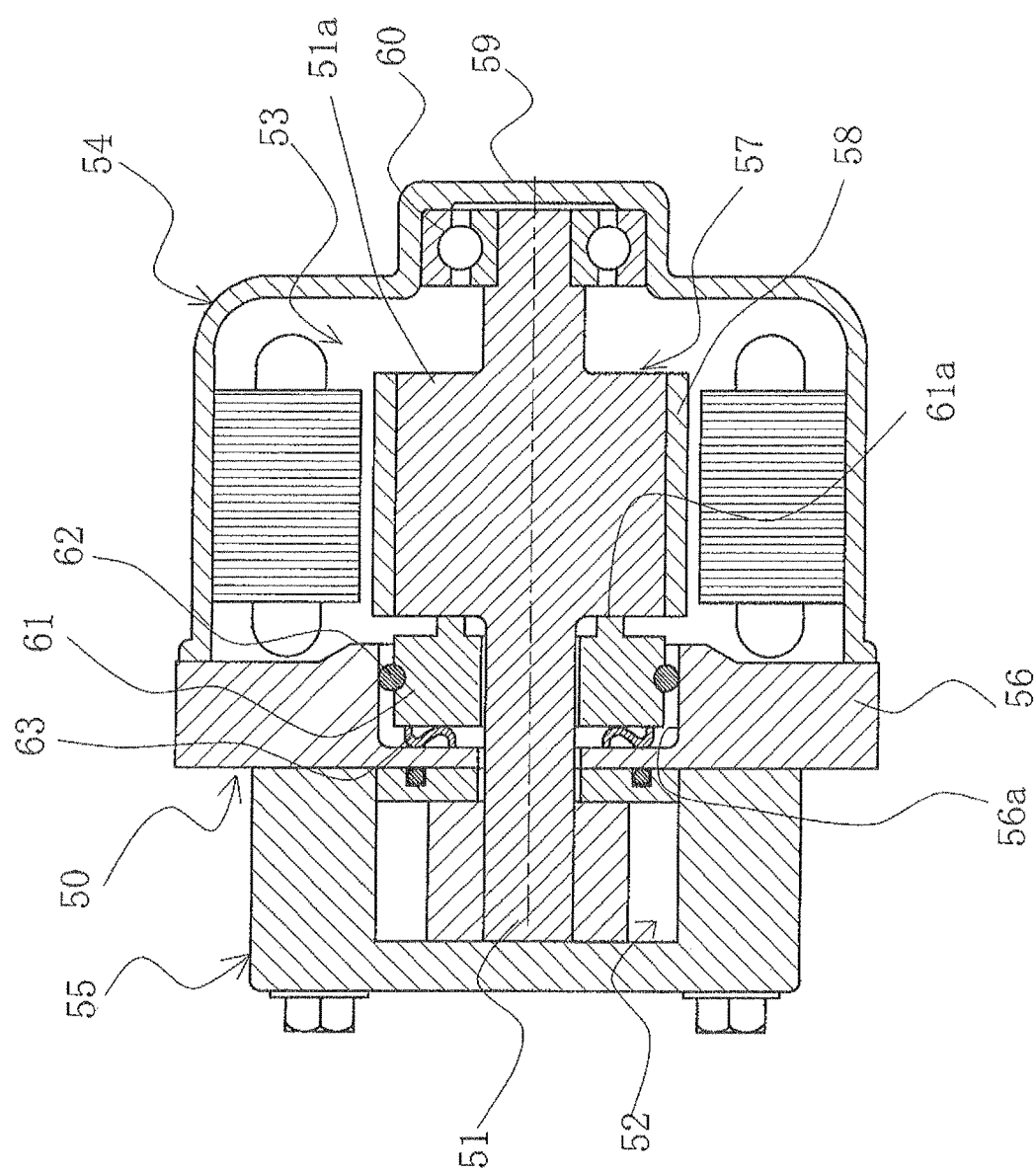
FIG. 3 is a view showing Conventional Art.

With reference to FIG. 2, a mechanical seal according to a second embodiment of the present invention will be described.

The mechanical seal according to the second embodiment is different from the first embodiment shown in FIG. 1 in that the mechanical seal is an inside type for sealing a fluid on a high-pressure fluid side which tends to leak from the outer periphery of a sealing face toward the inner circumferential direction, but other respects are basically the same as the first embodiment, so the same members as that of FIG. 1 are denoted by the same signs, and a repetitive description will be omitted.

A partition member 37 divides the pump housing 5 and the motor housing 6 and holds them. The partition member 37 also supports one end of the rotating shaft 2 via the seal ring, and has a predetermined thickness from the need of having a certain strength. Therefore, in the partition member 37, while a through hole 37a for inserting the rotating shaft 2 therein is formed in the pump part 3 side, a space 37b for arranging a seal ring (described later) therein is formed in the motor part 4 side. In this example, the partition member 37 has a cylindrical part protruding to the motor part 4 side, and the seal ring (described later) is supported on an inner periphery 37c of the cylindrical part.

Between an inner periphery 37c of the partition member 37 and an outer periphery of the rotating shaft 2, a rotating side seal ring 30 formed so as to constitute a slide bearing is arranged. The rotating side seal ring 30 has not only a mechanical strength but also self-lubricating, wear-resistant properties and the like, and for example, is formed of a material selected from carbon, SiC, hard metal or the like. Then, in an outer periphery 30a of the rotating side seal ring 30, the slide bearing is constituted between the inner periphery 37c of the partition member 37. The gap between the outer periphery 30a of the rotating side seal ring 30 and the inner periphery 37c of the partition member 37 is decided in consideration of the operating temperature, the material or the like, but it is determined according to the gap set in a normal slide bearing.

Moreover, an O-ring 32 is interposed between an outer periphery 30b of the rotating side seal ring 30 and the outer periphery of the rotating shaft 2. That is, the rotating side seal ring 30 firmly supports the rotating shaft 2 via the O-ring 32, and is supported on the inner periphery 37c of the partition member 37 in a portion constituting the slide bearing of the outer periphery 30a.

It should be noted that, in order to stop the rotation and to prevent the axial movement between the rotating side seal ring 30 and the rotating shaft 2, a projection (or a recess) is provided in the outer periphery 30b of the rotating side seal ring 30, a recess (or a projection) is provided on the rotating shaft 2 side opposed to the projection (or the recess), and they are fitted to each other, thereby the rotation and the axial movement between the rotating side seal ring 30 and the rotating shaft 2 may be prevented.

On the opposite side to the pump part 3 side (the sealed fluid side) of the rotating side seal ring 30, a stationary side seal ring 31 in opposed sliding contact with a rubbing face 30c (a sealing face) of the rotating side seal ring 30 is arranged. As with the rotating side seal ring 30, the stationary side seal ring 31 has not only a mechanical strength but also self-lubricating, wear-resistant properties and the like, and for example, the material is selected in consideration of familiarity with the other member from carbon, SiC, hard metal or the like.

By attaching a pressing member 35 for biasing the stationary side seal ring 31 toward the pump part 3 side in the axial direction, a rubbing face 31a of the stationary side seal ring 31 is pressed to a rubbing face 31c of the rotating side seal ring 30.

In this example, the pressing member 35 consists of a bellows, one end of the bellows 35 is coupled to a collar 33 and the other end thereof is coupled to a retainer 34, and the stationary side seal ring 31 is shrink-fitted or press-fitted to the end face of the retainer 34.

It should be noted that, as the pressing member, not only a bellows but also a coil spring may be, of course, used.

The collar 33 is formed of metal and formed into a ring shape, and is fixed to an inner periphery 37c of the cylindrical part of the partition member 37 via an O-ring 36.

The bellows 35 is formed into a bellows tube shape as a whole, by lining up a plurality of metallic diaphragm plates formed into a wave ring shape by means of punching or the like, and by alternately coupling the portions between the outer diameter parts and between the inner diameter parts of the adjacent diaphragm plates by means of gas welding or the like, and one end thereof is integrally coupled to the collar 33 side by means of gas welding or the like.

The retainer 34 is formed of metal and formed into a tubular shape, and the other end of the bellows 35 is integrally coupled thereto by means of gas welding or the like. The material of the retainer 34 is the same material as the material of the bellows 35 or is the different material whose thermal expansion coefficient is almost approximate thereto.

Usually, the retainer 34, the bellows 35, and the collar 33 are manufactured as a one-piece by welding.

In this example, the stationary side seal ring 31, the bellows 35 which is the pressing member, the collar 33, and the retainer 34 are arranged together with the cylindrical part of the partition member 37 within the storing space 2b formed in the large diameter part 2a of the rotating shaft 2 in consideration of shortening the axial dimension of the electric water pump.

When the electric water pump configured as above is operated, the rotating blade 8 of the pump part 3 is rotationally driven by a driving force of the motor part 4 via the rotating shaft 2, and pumps a liquid to a predetermined spot.

On that occasion, a high-pressure liquid within the pump chamber 9 infiltrates into the space 37b through the through hole 10a of the side plate 10 and the through hole 37a of the partition member 37. The liquid within the space 37b does not leak from the inner periphery 30b because it is sealed by the O-ring 32 arranged in the inner periphery 30b of the rotating side seal ring 30. On the other hand, in the outer periphery 30a of the rotating side seal ring 30, the slide bearing is constituted between the inner periphery 37c of the partition member 37, and the gap is formed between the outer periphery 30a and the outer periphery of the rotating shaft and the inner periphery 37c of the partition member 37, and therefore the liquid leaks to the motor part 4 side through the gap.

However, because the leaked liquid is sealed by a sealing part formed by the rubbing face 30c of the rotating side seal ring 30 and the rubbing face 31a of the stationary side seal ring 31, it does not leak to the inner diameter side than the sealing part. Moreover, because the collar 33 is fixed to the inner periphery 37c of the cylindrical part of the partition member 37 via the O-ring 36, the liquid is prevented also from leaking outwardly from the outer diameter side of the stationary side seal ring 31, the retainer 34, the bellows 35, and the collar 33.

In this way, the high-pressure liquid within the pump chamber 9 does not leak to the motor part 4 side.

The above-described second embodiment exhibits the following effects.

(1) By constituting the slide bearing in the rotating side seal ring 30 which integrally holds the rotating shaft 2 and attaching the pressing member 35 which biases the stationary side seal ring 31 in the axial direction to the stationary side seal ring 31, it goes without saying that the rotating side seal ring 30 can be also used as the bearing, and the need for axial movement of the rotating side seal ring 30 is eliminated, and therefore, the gap of the slide bearing can be reduced. As a result, in the case where the rotating side seal ring 30 is also used as the bearing, a good slide bearing with less shaft run-out of the rotating shaft can be obtained.

(2) By installing, on the high-pressure fluid side (the sealed fluid side), the rotating side seal ring 30 constituting the slide bearing which supports the rotating shaft 2, it is unnecessary to newly supply a lubricant to the slide bearing portion.

(3) By constituting the stationary side seal ring 31 from another dedicated member without using also a portion of the rotating shaft 2, replacement can be facilitated if the stationary side seal ring 31 needs to be replaced due to damage or wear. Moreover, because design flexibility of the stationary side seal ring 31 is increased, the stationary side seal ring 31 can be made small, and in accordance with this, the pressing member 35 for axial pressing also can be miniaturized, and therefore the entire mechanical seal can be made compact.

(4) By arranging the rotating side seal ring 30 within the space of the partition member 37, the space can be effectively used, and the axial dimension of the electric water pump can be shortened.

(5) By arranging the stationary side seal ring 31, the bellows 35 which is the pressing member, the collar 33, and the retainer 34 within the storing space 2b formed in the large diameter part 2a of the rotating shaft 2, the axial dimension of the electric water pump can be shortened.

Hereinbefore, the embodiments of the present invention were described using the drawings, but specific configurations are not limited to these embodiments, and even other changes and additions without departing from the scope of the present invention are also included in the present invention.

For example, in the above embodiments, the case where the mechanical seal according to the present invention is applied to a small electric water pump in which a pump chamber for pumping a liquid and an electric motor chamber under the air environment are disposed adjacently was described, but the present invention is not limited thereto and is also applicable to, for example, an oil pump or the like.

Moreover, for example, in the above embodiments, the case where the spaces are provided in the partition member and the large diameter part of the rotating shaft of the electric water pump, and the seal rings are arranged in these spaces to reduce the axial dimension was described, but the present invention is not limited thereto, and dedicated spaces for arranging the seal rings may be provided if the axial dimension does not have to be reduced, for example.

Moreover, for example, in the above embodiments, the case where the bellows is used as the pressing member was described, but the present invention is not limited thereto, and for example, a coil spring may be, of course, used.

REFERENCE SIGNS LIST

1 Housing
2 Rotating shaft
3 Pump part
4 Motor part
5 Pump housing
6 Motor housing
7 Partition member
8 Rotating blade
9 Pump chamber
10 Side plate
11 O-ring
12 Stator part
13 Rotor part
14 Ball bearing
15 Magnet
20 Stationary side seal ring
21 Rotating side seal ring
22 O-ring
23 Collar
24 Retainer
25 Pressing member
26 O-ring
30 Rotating side seal ring
31 Stationary side seal ring
32 O-ring
33 Collar
34 Retainer
35 Pressing member
36 O-ring
37 Partition member

The invention claimed is:

1. A mechanical seal of an inside type which is housed in a seal cavity formed between a housing and a rotating shaft and which seals a fluid tending to leak to an inner diameter side of a sealing face between the housing and the rotating shaft, wherein:
   the housing is a housing of an electric water pump, the housing is provided with a pump part, a motor part, and a partition member dividing the pump part and the motor part;
   the mechanical seal comprises a stationary side seal ring fixed to the housing and a rotating side seal ring fixed to the rotating shaft in opposed sliding contact with the stationary side seal ring, the rotating side seal ring is disposed on a sealed fluid side, the stationary side seal ring is disposed on the opposite side to the sealed fluid side, and a pressing member having a collar and a retainer, wherein said collar includes an O-ring in contact with the partition member, is attached to the stationary side seal ring for biasing the stationary side seal ring in an axial direction to press the sealing faces of both the seal rings, and
   wherein an outer surface portion of the rotating side seal ring and an inner surface portion of the partition member cooperatively constitute a slide bearing, slidably holding the rotating shaft.

2. The mechanical seal as set forth in claim 1, wherein: an O-ring is interposed between an inner periphery of the rotating side seal ring and the outer periphery of the rotating shaft.

3. The mechanical seal as set forth in claim 1, wherein:
   the housing is a housing of an electric water pump, the housing is provided with a pump part, a motor part, and a partition member dividing the pump part and the motor part,
   the rotating side seal ring has an end surface on an opposite side of the stationary side seal ring in an axial direction, and
   the end surface of the rotating side seal ring faces to an inner surface of the partition member at a predetermined interval.

* * * * *